United States Patent
Chen

(10) Patent No.: US 11,122,232 B2
(45) Date of Patent: Sep. 14, 2021

(54) PIXEL COLLECTION CIRCUIT AND OPTICAL FLOW SENSOR

(71) Applicant: OmniVision Sensor Solution (Shanghai) Co., Ltd, Shanghai (CN)

(72) Inventor: Shoushun Chen, Shanghai (CN)

(73) Assignee: OMNIVISION SENSOR SOLUTION (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 17/030,864

(22) Filed: Sep. 24, 2020

(65) Prior Publication Data

US 2021/0037202 A1 Feb. 4, 2021

Related U.S. Application Data

(63) Continuation of application No. PCT/CN2018/088260, filed on May 24, 2018.

(30) Foreign Application Priority Data

Apr. 25, 2018 (CN) .......................... 201810380023.8

(51) Int. Cl.
*H04N 5/378* (2011.01)
*H04N 5/3745* (2011.01)
*H04N 5/376* (2011.01)
*G01J 1/16* (2006.01)

(52) U.S. Cl.
CPC ................ *H04N 5/378* (2013.01); *G01J 1/16* (2013.01); *H04N 5/3765* (2013.01); *H04N 5/37452* (2013.01)

(58) Field of Classification Search
CPC .. H04N 5/378; H04N 5/37452; H04N 5/3765; G01J 1/16
See application file for complete search history.

(56) References Cited

U.S. PATENT DOCUMENTS

| | | | |
|---|---|---|---|
| 6,253,161 B1* | 6/2001 | Arias-Estrada | H04N 5/374 702/150 |
| 2016/0109955 A1* | 4/2016 | Park | G06F 3/0346 345/668 |
| 2018/0035067 A1* | 2/2018 | Tyrrell | H04N 5/37455 |
| 2018/0039601 A1* | 2/2018 | Park | G06K 9/522 |
| 2018/0191972 A1* | 7/2018 | Berner | H04N 5/378 |
| 2018/0268553 A1* | 9/2018 | Chen | H04N 5/3765 |
| 2019/0007594 A1* | 1/2019 | Sato | H04N 5/3745 |
| 2019/0318486 A1* | 10/2019 | Gupta | H04N 13/243 |

FOREIGN PATENT DOCUMENTS

| | | |
|---|---|---|
| CN | 106097699 A | 11/2016 |
| CN | 106162000 A | 11/2016 |

OTHER PUBLICATIONS

PCT/CN2018/088260 ISA210 ISR dated Sep. 19, 2018.

* cited by examiner

*Primary Examiner* — Nhan T Tran
(74) *Attorney, Agent, or Firm* — IPro, PLLC

(57) ABSTRACT

The present disclosure provides a pixel collection circuit and an optical flow sensor including the pixel collection circuit. The pixel collection circuit at least includes a light intensity detector, a first state storage module, a second state storage module, a light intensity signal collection and storage module, and a time information storage module.

10 Claims, 3 Drawing Sheets

PIXEL COLLECTION CIRCUIT AND OPTICAL FLOW SENSOR

TECHNICAL FIELD

The present disclosure relates to the field of image collection technology, in particular to a pixel collection circuit and an optical flow sensor.

BACKGROUND

Along with the continuous development of the information technology, computer vision and image information processing become more and more important. For an optical flow method, the movement of a target object may be determined in accordance with image information, and this method may be applied to various fields such as military aerospace, traffic control, information science, meteorological service and medicine.

The concept of "optical flow" was originally presented by Gibson in 1950. An entity is imaged by a photosensitive element, and points in a resultant image correspond to points on the entity in a one-to-one correspondence manner. When a target object moves in a three-dimensional scenario, an image brightness mode in a corresponding image frame sequence may exhibit a flowing state. This flowing state of the image brightness mode may be called as "optical flow". After years of study, various improved versions of an optical flow algorithm have been proposed, but an optical flow constraint equation is still a main constraint condition. Parameters in the optical flow constraint equation include a horizontal gradient value and a longitudinal gradient value of a pixel point, and a light intensity change of the pixel point within a relatively short time period. A conventional optical flow method is mainly performed on the basis of frame calculation. When a background in a field of vision is stationary or there is merely a very tiny change, a large quantity of redundant data information may be generated due to the frame calculation. All pixel information needs to be processed so as to acquire the horizontal gradient value, the longitudinal gradient value and the light intensity change, so a large quantity of parallel computation may be performed for processing the image, and thereby the movement analysis on the target object may be performed slowly. Especially for an object at a high speed, an analysis result may be greatly different from an actual movement state due to any short time delay. Hence, it is very important to increase an analysis speed for the target object at a high speed.

In a word, there is an urgent need to provide a new optical flow collection scheme.

SUMMARY

An object of the present disclosure is to provide a pixel collection circuit and an optical flow sensor, so as to solve or at least alleviate at least one of the above-mentioned problems.

In one aspect, the present disclosure provides in some embodiments a pixel collection circuit, including: a light intensity detector which is configured to output in real time a first electric signal representing an intensity of a received optical signal; a first state storage module, a first input end of which is coupled to the light intensity detector, a first output end of which is coupled to a row request line, a second output end of which is coupled to a column request line, and which is configured to enable the pixel collection circuit to be an initiatively-activated state and store the initiatively-activated state when a change of the first electric signal meets a predetermined condition, transmit a row request signal and/or a column request signal to the row request line and/or the column request line in the initiatively-activated state, and transmit a pulse signal to at least one adjacent pixel collection circuit in the initiatively-activated state; a second state storage module, a first input end of which is coupled to at least one adjacent pixel collection circuit, an output end of which is coupled to the first state storage module, and which is configured to, upon the receipt of a pulse signal from the at least one adjacent pixel collection circuit, enable the pixel collection circuit to be in a passively-activated state and store the passively-activated state, and transmit a notification to the first state storage module in the passively-activated state, so as to enable the first state storage module to transmit the row request signal and/or the column request signal to the row request line and/or the column request line; a light intensity signal collection and storage module, a first input end of which is coupled to an output end of the light intensity detector, a second input end of which is coupled to the first state storage module, a third input end of which is coupled to the second state storage module, and which is configured to store and output the first electric signal as a light intensity signal in accordance with the state of the pixel collection circuit; and a time information storage module, a first input end of which is coupled to a time signal line, a second input end of which is coupled to the first state storage module, a third input end of which is coupled to the second state storage module, and which is configured to store and output a corresponding time signal in accordance with the state of the pixel collection circuit.

In a possible embodiment of the present disclosure, the pixel collection circuit further includes: a light intensity change amplifier, an input end of which is coupled to the output end of the light intensity detector and which is configured to preprocess the first electric signal so as to generate a second electric signal; and a dual-threshold filter, an output end of which is coupled to an output end of the light intensity change amplifier, and which is configured to determine whether a change of the second electric signal meets the predetermined condition. The first state storage module is coupled to the dual-threshold filter and further configured to enable the pixel collection circuit to be in the initiatively-activated state when the change of the second electric signal meets the predetermined condition.

In another aspect, the present disclosure provides in some embodiments an optical flow sensor, including: a pixel collection circuit array which includes a plurality of the above-mentioned pixel collection circuits; a pixel row signal communication unit which is configured to respond to each row request signal from the pixel collection circuit array, and output a row address of a row which has responded to the row request signal; a pixel column signal communication unit which is configured to respond to each column request signal from the pixel collection circuit array, and output a column address of a column which has responded to the column request signal, a corresponding light intensity signal, and a corresponding time signal; a time control unit which is configured to output a first time signal via a time signal line to the pixel collection circuit array; and a central adjustment and control unit which is configured to control the output of the row address, the column address, the time signal and the light intensity signal.

According to the embodiments of the present disclosure, each pixel collection circuit in the pixel collection circuit array of the optical flow sensor may detect in real time a light intensity change in a field of vision, and when the light intensity change meets the predetermined condition, the pixel collection circuit may be triggered to be in the initiatively-activated state. The pixel collection circuit in the initiatively-activated state may transmit the pulse signal to four or more pixel collection circuits surrounding the pixel collection circuit, so as to enable the adjacent pixel collection circuits in a nonactivated state to be in the passively-activated state. When each pixel collection circuit is activated initiatively, light intensity information and time information about this pixel collection circuit and the passively-activated pixel collection circuits may be sampled, stored and output to an image collection system.

According to the optical flow sensor in the embodiments of the present disclosure, it is able to collect a light intensity of a corresponding pixel point of a target object in the field of vision at a certain moment, light intensities of the pixel points surrounding the pixel point, and light intensities of the same pixel point at different moments, thereby to acquire parameters of an optical flow constraint equation for an optical flow algorithm, i.e., a time-domain gradient value and a space-domain gradient value of the pixel point. As a result, it is able to extract the parameters through hardware, and reduce the quantity of parallel computation for the subsequent data processing, thereby to rapidly identify and process the target object at a high speed.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION OF THE EMBODIMENTS

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Figure 1:
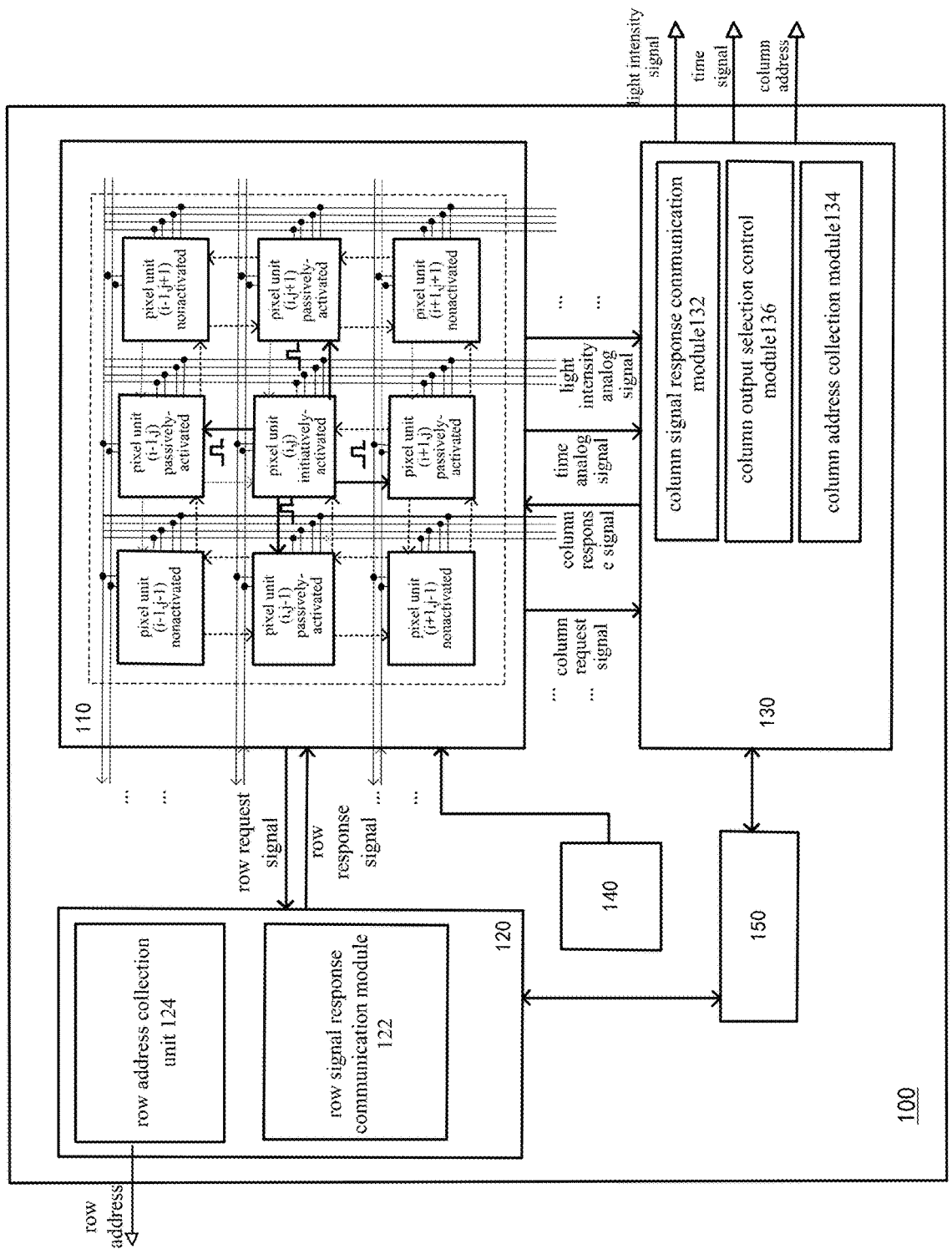
FIG. 1 is a schematic view showing an optical flow sensor 100 according to one embodiment of the present disclosure.

As shown in FIG. 1, the present disclosure provides in some embodiments an optical flow sensor 100 for detecting and tracking an object at a high speed, so as to extract parameters for an optical flow algorithm. The optical flow sensor 100 may be coupled to an external image collection system, so as to transmit the extracted parameters to the external image collection system for the subsequent calculation. The optical flow sensor 100 at least includes a pixel collection circuit array 110, a pixel row signal communication unit 120, a pixel column signal communication unit 130, a time control unit 140 and a central adjustment and control unit 150.

Figure 2:
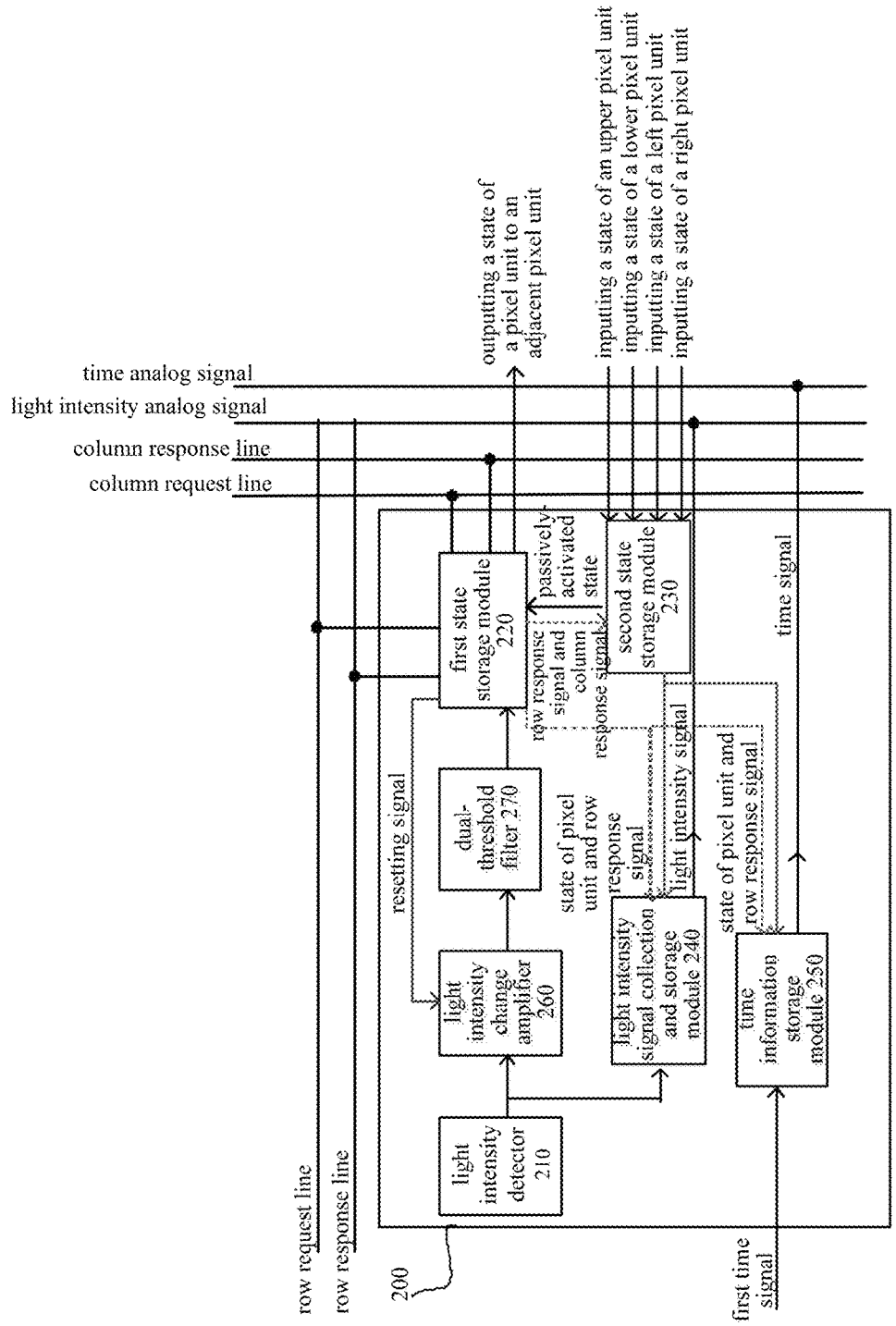
FIG. 2 is a schematic view showing a pixel collection circuit 200 according to one embodiment of the present disclosure.

During the implementation, the pixel collection circuit array 110 consists of a plurality of same pixel collection circuits (or pixel units) arranged in a one-dimensional or two-dimensional manner, and FIG. 2 shows a structure of each pixel collection circuit. A 3*3 pixel collection circuit array is shown in FIG. 1, but the present disclosure is not limited thereto. Each pixel collection circuit may detect light intensity information in a field of vision in real time, and when there is a relative light intensity change that exceeds a predetermined threshold, the pixel collection circuit may be activated. In a possible embodiment of the present disclosure, the threshold may be set through a high-pass filter in accordance with different application scenarios, so as to ensure that merely the light intensity change exceeding the threshold is considered as "movement" and thereby detected. The pixel collection circuit activated in this way may be called as an initiatively-activated pixel unit. The initiatively-activated pixel unit may transmit a pulse signal to four or more adjacent pixel units, so as to enable the adjacent pixel units in a nonactivated state to be in a passively-activated state. As shown in FIG. 1, a pixel unit (i,j) is in the initiatively-activated state, and it may transmit the pulse signal (indicated by ⊓ in FIG. 1) to four pixel unit, i.e., an upper pixel unit, a lower pixel unit, a left pixel unit and a right pixel unit, so as to enable the pixel units (i−1,j), (i+1,j), (i,j−1) and (i,j+1) to be in the passively-activated state. No matter whether a current pixel unit is initiatively activated or passively activated, light intensity information and time information may be sampled and stored in the current pixel unit when it has been activated, and read when the current pixel unit has been selected.

The pixel row signal communication unit 120 may take charge of managing the pixel collection circuit array 110 in a row direction, so as to ensure that a current row of pixel collection circuits is selected merely when the current row of pixel collection circuits includes an activated pixel unit, and merely one row of pixel collection circuits is selected and read at the same time. Processings performed by the pixel row signal communication unit 120 on the pixel collection circuit array 110 may include, but not limited to, responding to a row request signal from the pixel collection circuit array 110, returning a row response signal to the corresponding pixel collection circuit, and outputting a row address of a row which has responded to the row request signal.

The pixel row signal communication unit 120 includes a row signal response communication module 122 and a row address collection unit 124. The row signal response communication module 122 is configured to receive the row request signals from at least one pixel collection circuit of the pixel collection circuit array 110, and output the row response signal with respect to one of the row request signals. In a possible embodiment of the present disclosure, the row signal response communication module 122 may respond to a plurality of row request signals sequentially through a scanner, or respond to the plurality of row request signals randomly. Regardless of the above, the row signal response communication module 122 may merely respond to one row request signal each time, so as to prevent the occurrence of conflict. The row address collection unit 124 is configured to output encoding information about the row address of the row which has responded to the row request signal.

Correspondingly, the pixel column signal communication unit 130 may take charge of managing the pixel collection circuit array 110 in a column direction, and processing the activated pixel units, so as to ensure that a current column of pixel collection circuits is selected merely when the current column of pixel collection circuits includes an activated pixel unit, and merely one column of pixel collection circuits is selected and read at the same time. In addition, the pixel column signal communication unit 130 may report the light intensity information and time information stored in the activated pixel unit to an external image acquisition system. Processings performed by the pixel column signal communication unit 130 on the pixel collection circuit array 110 may include, but not limited to, responding to a column request signal from the pixel collection circuit array 110, returning a column response signal to the corresponding pixel collection circuit, and outputting a column address of a column which has responded to the column request signal, a corresponding light intensity signal and a corresponding time signal.

The pixel column signal communication unit 130 includes a column signal response communication module 132, a column address collection unit 134 and a column output selection control module 136. The column signal response communication module 132 is configured to receive column request signals from at least one pixel collection circuit of the pixel collection circuit array 110, and output the column response signal with respect to one of the row request signals. The column signal response communication module 132 may respond to a plurality of column request signals sequentially through a scanner, or respond to the plurality of column request signals randomly. Regardless of the above, the column signal response communication module 132 may merely respond to one column request signal each time, so as to prevent the occurrence of conflict. The column address collection unit 134 is configured to output encoding information about a column address of a column which has responded to the column request signal. The column output selection control module 136 is configured to control an output sequence of the light intensity signal, the time signal and the column address.

The time control unit 140 is configured to generate a first time signal which is temporally consecutive, and transmit the first time signal to the pixel collection circuit array 110 via a time signal line.

The central adjustment and control unit 150 is configured to control the output of the row address, the column address, the time signal and the light intensity signal. In a possible embodiment of the present disclosure, the central adjustment and control unit 150 may output a light intensity of a corresponding pixel unit of a target object at a certain moment in the field of vision in accordance with a requirement of a processing device.

The pixel collection circuit of the pixel collection circuit array 110 will be described hereinafter in conjunction with FIG. 2 which shows the pixel collection circuit 200.

The pixel collection circuit 200 at least includes a light intensity detector 210, a first state storage module 220, a second state storage module 230, a light intensity signal collection and storage module 240, and a time information storage module 250. A first input end of the first state storage module 220 is coupled to the light intensity detector 210, a first output end thereof is coupled to a row request line, and a second output end thereof is coupled to a column request line. A first input end of the second state storage module 230 is coupled to at least one adjacent pixel collection circuit, and an output end thereof is coupled to the first state storage module 220. A first input end of the light intensity signal collection and storage module 240 is coupled to an output end of the light intensity detector 210, a second input end thereof is coupled to the first state storage module 220, and a third input end thereof is coupled to the second state storage module 230. A first input end of the time information storage module 250 is coupled to the time signal line, a second input end thereof is coupled to the first state storage module 220, and a third input end thereof is coupled to the second state storage module 230.

In a possible embodiment of the present disclosure, the pixel collection circuit 200 further includes a light intensity change amplifier 260 and a dual-threshold filter 270 sequentially arranged between the light intensity detector 210 and the first state storage module 220. To be specific, an input end of the light intensity change amplifier 260 is coupled to the output end of the light intensity detector 210, and an output end of the dual-threshold filter 270 is coupled to an output end of the light intensity change amplifier 260. In this way, the first input end of the first state storage module 22 is coupled to the dual-threshold filter 270, as shown in FIG. 2.

The components of the pixel collection circuit 200 will be described hereinafter in more details.

Figure 3A:
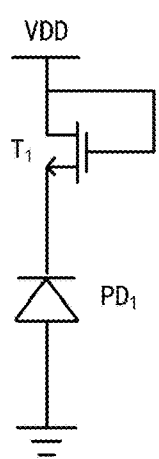
FIGS. 3A to 3C are schematic views showing a light intensity detector 210 according to one embodiment of the present disclosure.
Figure 3B:
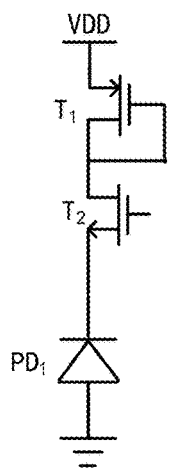
Figure 3C:
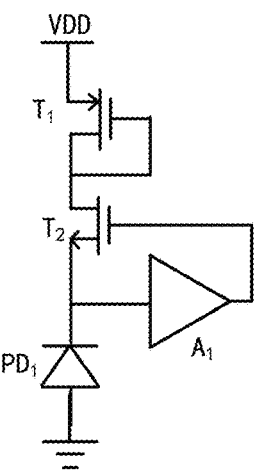

The light intensity detector 210 is configured to output in real time a first electric signal representing an intensity of a received optical signal. In other words, the light intensity detector 210 may convert a generated photocurrent into the first electric signal which is capable of changing in real time along with the detected light intensity. In a possible embodiment of the present disclosure, the light intensity detector 210 may be an active logarithmic photoelectric detector capable of converting the photocurrent into a continuous time-voltage signal in logarithmic relation with the photocurrent, and a bandwidth of the photoelectric detector may be increased through negative feedback. In another possible embodiment of the present disclosure, the light intensity detector 210 may also be a passive logarithmic photoelectric detector, or a plurality of layers of transistors may be superimposed one on another so as to provide the photoelectric detector with a larger voltage-to-current conversion gain. FIGS. 3A to 3C show the structures of the light intensity detector 210.

As shown in FIG. 3A, the light intensity detector 210 includes a photodiode $PD_1$ whose anode is grounded, and a first transistor $T_1$, a source electrode of which is connected to a cathode of the photodiode $PD_1$, and a drain electrode and a gate electrode of which are connected to a power source VDD. In an application scenario, the photodiode $PD_1$ may generate a current I upon the receipt of the optical signal. Based on this, there is a linear relationship between lnI and a change in a voltage generated between the source electrode and the gate electrode of the first transistor $T_1$. In other words, the first electric signal from the light intensity detector is in logarithmic relation with the intensity of the received optical signal.

As shown in FIG. 3B, the light intensity detector 210 includes a photodiode $PD_1$ whose anode is grounded, a first transistor $T_1$ and a second transistor $T_2$. A source electrode of the first transistor $T_1$ is connected to the power source VDD, a gate electrode and a drain electrode thereof are connected to a drain electrode of the second transistor $T_2$, and a source electrode of the second transistor $T_2$ is connected to a cathode of the photodiode $PD_1$.

As shown in FIG. 3C, the light intensity detector 210 includes a photodiode $PD_1$ whose anode is grounded, N transistors connected to each other in series (N≥2), and a first amplifier $A_1$. A source electrode of a first transistor is connected to a cathode of the photodiode $PD_1$, a source electrode of an $N^{th}$ transistor is connected to the power source VDD, a drain electrode of each of a second to the $N^{th}$ transistors is connected to a source electrode of a previous transistor, and a gate electrode of each of the second to the $N^{th}$ transistors is connected to a drain electrode of the previous transistor. The first amplifier $A_1$ is connected between the cathode of the photodiode $PD_1$ and a gate electrode of the first transistor. Through the first amplifier $A_1$, it is able for the pixel collection circuit to detect the light intensity change in a more rapid manner. FIG. 3C merely shows the structure of the light intensity detector 210 when N=2, and base on this, it is easy for a person skilled in the art to acquire the structure of the light intensity detector 210 where N>2, which will not be particularly defined herein.

Apart from the above, the light intensity detector may also be any well-known highly real-time photoelectric detector, which will not be particularly defined herein. It should be appreciated that, for a conventional photoelectric detection technology, usually a capacitor needs to be charged, then the light intensity detector needs to be exposed continuously (i.e., the capacitor needs to be discharged continuously), and then an accumulated light intensity may be determined in accordance with a remaining capacity of the capacitor. In the embodiments of the present disclosure, it is unnecessary to expose the light intensity detector 210 when the first electric signal representing the intensity of the optical signal has been generated by the light intensity detector 210, so it is able for the light intensity detector 210 to output the first electric signal without any delay.

The light intensity change amplifier 260 is configured to preprocess the first electric signal so as to generate a second electric signal. In a possible embodiment of the present disclosure, the preprocessing may include the isolation of a direct current component and the amplification of an alternating current component, so as to amplify the first electric signal. Through the light intensity change amplifier 260, it is able to increase the light intensity detection sensitivity of the pixel collection circuit 200.

Figure 4A:
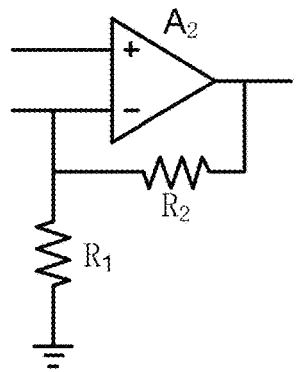
FIGS. 4A to 4C are schematic views showing a light intensity change amplifier 260 according to one embodiment of the present disclosure.
Figure 4B:
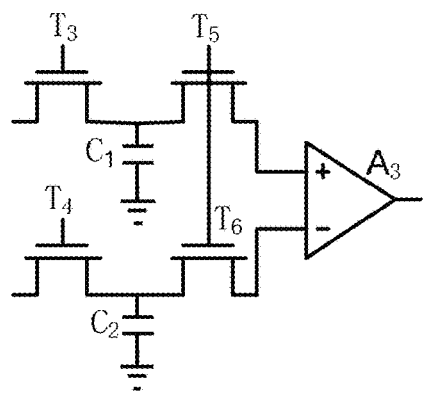
Figure 4C:
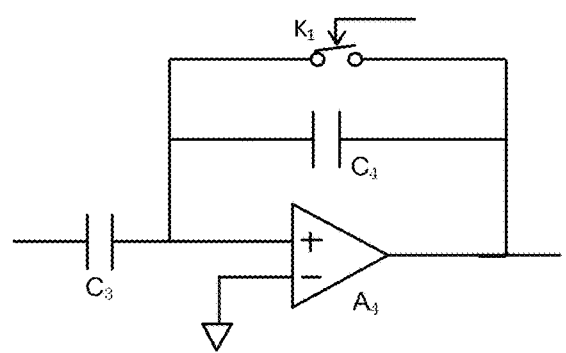

In a possible embodiment of the present disclosure, the light intensity change amplifier 260 may be a switched-capacitor amplification circuit, which is configured to isolate the direct current component of an output voltage from the light intensity detector 210, and provide a gain for the alternating current component through setting a ratio between capacitances of two capacitors. In another possible embodiment of the present disclosure, the light intensity change amplifier 260 may be a resistance-feedback amplifier or a correlated double sampling circuit. FIGS. 4A to 4C show the structures of the light intensity change amplifier 260.

As shown in FIG. 4A, the light intensity change amplifier 260 includes a second amplifier $A_2$, a first resistor $R_1$ and a second resistor $R_2$. A positive pole of the second amplifier A2 is connected to the output end of the light intensity detector 210, a negative pole thereof is connected to the first pull-down resistor $R_1$, and the second resistor $R_2$ is connected between an output end and the negative pole of the second amplifier $A_2$.

As shown in FIG. 4B, the light intensity change amplifier 260 may be the correlated double sampling circuit, which may include: a third transistor $T_3$, a drain electrode of which is connected to the output end of the light intensity detector 210; a fourth transistor $T_4$, a drain electrode of which is connected to the output end of the light intensity detector 210; a first capacitor $C_1$, a first end of which is connected to a source electrode of the third transistor $T_3$, and a second end of which is grounded; a second capacitor $C_2$, a first end of which is connected to a source electrode of the fourth transistor $T_4$, and a second end of which is grounded; a fifth transistor $T_5$, a drain electrode of which is connected to the first end of the first capacitor $C_1$; a sixth transistor $T_6$, a gate electrode of which is connected to a gate electrode of the fifth transistor, and a drain electrode of which is connected to the first end of the second capacitor $C_2$; and a third amplifier $A_3$, a positive pole of which is connected to a source electrode of the fifth transistor $T_5$, and a negative pole of which is connected to a source electrode of the sixth transistor $T_6$. In FIG. 4B, at an initial time, the transistors of the light intensity change amplifier 260 may be turned off. During the operation of the pixel collection circuit, at a time t1, $T_3$ may be turned on, so as to sample a to-be-sampled voltage to the capacitor $C_1$, and after a sampling time period, $T_1$ may be turned off. At a time t2 (a difference between t2 and t1 needs to be greater than the sampling time period), $T_4$ may be turned on, so as to sample a to-be-sampled voltage to the capacitor $C_2$, and after the sampling time period, $T_4$ may be turned off. At a time t3 (a difference between t3 and t2 needs to be greater than the sampling time period), $T_5$ may be turned on, and the third amplifier $A_3$ may amplify a voltage difference between the positive and negative poles and output a voltage.

As shown in FIG. 4C, the light intensity change amplifier 260 includes a fourth amplifier $A_4$, a third capacitor $C_3$, a fourth capacitor $C_4$ and a first switch $K_1$. A first end of the third capacitor $C_3$ is connected to the output end of the light intensity detector 210, a negative pole of the fourth amplifier $A_4$ is configured to receive a fixed potential, a positive pole of the fourth amplifier $A_4$ is connected to a second end of the third capacitor $C_3$, and the fourth capacitor $C_4$ and the first switch $K_1$ are connected in parallel between the positive pole and an output end of the fourth amplifier $A_4$. Upon the receipt of a resetting signal from the first state storage module 220, the first switch $K_1$ may be switched on.

It should be appreciated that, apart from the above structures, the light intensity change amplifier 260 may also be any other known light intensity change amplifier, which also falls within the scope of the present disclosure and thus will not be particularly defined herein.

The dual-threshold filter 270 is configured to determine whether a change of the first electric signal processed by the light intensity change amplifier 260 (i.e., the second electric signal) meets a predetermined condition. In a possible embodiment of the present disclosure, the dual-threshold filter 270 may be a continuous time comparator. Through setting a positive threshold and a negative threshold, it is able to determine whether the light intensity increases or decreases.

Depending on a desired configuration, the dual-threshold filter 270 may be configured to determine whether the second electric signal is smaller than the negative threshold or greater than the positive threshold through two voltage comparators, and when the second electric signal is smaller than the negative threshold or greater than the positive threshold, determine that the change of the second electric signal meets the predetermined condition.

In the embodiments of the present disclosure, each pixel unit may be in one of the following states, i.e., the initiatively-activated state, the passively-activated state and the nonactivated state. The initiatively-activated state and the passively-activated state may be collectively called as an activated state. The first state storage module 220 is configured to store therein the initiatively-activated state and the nonactivated state of the pixel unit, and the second state storage module 230 is configured to store therein the passively-activated state and the nonactivated state of the pixel unit.

When the change of the first electric signal processed by the dual-threshold filter 270 (i.e., the second electric signal) meets the predetermined condition, the pixel unit may be triggered to be in the initiatively-activated state, and at this time, the first state storage module 220 may store the initiatively-activated state. In a possible embodiment of the present disclosure, the pixel collection circuit may communicate with an adjacent pixel collection circuit through the first state storage module 220. The first state storage module 220 may transmit the row request signal to each row request line in the initiatively-activated state. As mentioned above, upon the receipt of the row request signals, the pixel row signal communication unit 120 of the optical flow sensor may randomly respond to one of the row request signals for the plurality of rows of pixel collection circuits. A second input end of the first state storage module 220 may be coupled to a row response line, and a third input end thereof may be coupled to a column response line. In the activated state (i.e., the initiatively-activated state or the passively-activated state), upon the receipt of the row response signal from the pixel row signal communication unit 120, the first state storage module 220 may transmit the column request signal to the column request line, notify the light intensity signal collection and storage module 240 to output the first electric signal as the light intensity signal, and notify the time information module 260 to output the corresponding time signal.

In another possible embodiment of the present disclosure, the first state storage module 220 may transmit the pulse signal to at least one adjacent pixel collection circuit in the activated state, so as to enable the at least one adjacent pixel collection circuit to be in the passively-activated state. For example, the first state storage module 220 in the activated state may transmit the pulse signal to four pixel units, i.e., an upper pixel unit, a lower pixel unit, a left pixel unit and a right pixel unit, so as to enable these pixel units to be in the passively-activated state.

In yet another possible embodiment of the present disclosure, the first state storage module 220 may be configured to deactivate the pixel collection circuit, i.e., enable the pixel collection circuit to be in the nonactivated state, upon the receipt of the row response signal from the row response line and the column response signal from the column response line simultaneously. As shown in FIG. 2, a third output end of the first state storage module 220 is coupled to the light intensity change amplifier 260, and when the pixel collection circuit is in the activated state or the nonactivated state, transmits a resetting signal to the light intensity change amplifier 260. Depending on a desired configuration, the first state storage module 220 includes a first latch configured to store the activated state and the nonactivated state. When the second electric signal meets the predetermined condition, the first latch may be set, i.e., the pixel unit may be in the activated state. When both the row response signal and the column response signal have been received simultaneously, the first latch may be reset, i.e., the pixel unit may be in the nonactivated state. Each time when the first latch is set or reset, the first state storage module may transmit the resetting signal to the light intensity change amplifier 260.

Upon the receipt of the pulse signal from the at least one adjacent pixel collection circuit, the pixel unit may be in the passively-activated state, and at this time, the second state storage module 230 may store the passively-activated state. The pixel units may communicate with each other through the second state storage module 230. In a possible embodiment of the present disclosure, each pixel unit may communicate with four pixel units, i.e., an upper pixel unit, a lower pixel unit, a left pixel unit and a right pixel unit. Upon the receipt of the pulse signal from at least one of the four pixel units, the pixel unit may be in the passively-activated state, and may not transmit the pulse signal to the other pixel unit. In addition, the pixel unit in the passively-activated state may detect the light intensity change continuously, and prior to the reception of the row response signal, it may also be triggered to be in the initiatively-activated state.

In the passively-activated state, the second state storage module 230 may transmit a notification to the first state storage module 220, so as to enable the first state storage module in the activated state to transmit the row request signal to each row request line. As mentioned hereinabove, upon the receipt of the row request signals, the pixel row signal communication unit 120 of the optical flow sensor may randomly respond to one of the row request signals for the plurality of rows of pixel collection circuits.

In a possible embodiment of the present disclosure, a second input end of the second state storage module 230 is coupled to the row response line, and a third input end thereof is coupled to the column response line (not shown in FIG. 2). In the activated state, upon the receipt of the row response signal from the pixel row signal communication unit 120 by the second state storage module 230, the first state storage module 220 may transmit the column request signal to the column request line, notify the light intensity signal collection and storage module 240 to output the first electric signal as the light intensity signal, and notify the time information module 260 to output the corresponding time signal.

It should be appreciated that, the second state storage module 230 may also be directly coupled to the first state storage module 220. In the activated state, the second state storage module 230 may receive, through the first state storage module 220, the row response signal from the row response line and the column response signal from the column response line. In other words, inside the pixel unit, the modules may be directly connected to the row response line and/or the column response line so as to acquire the corresponding response signal, or the corresponding response signal may be cached in the first state storage module 220 and then transmitted to these modules (e.g., the second state storage module 230, the light intensity signal collection and storage module 240, and the time information storage module 250), which will not be particularly defined herein.

In another possible embodiment of the present disclosure, when the second state storage module 230 has received the row response signal from the row response line and the column response signal from the column response line simultaneously, the pixel unit may be deactivated, and the second state storage module 230 may transmit, through the first state storage module 220, the resetting signal to the light intensity change amplifier 260. Depending on a desired configuration, the second state storage module 230 may include a second latch configured to store the passively-activated state and the nonactivated state. Upon the receipt of the pulse signal from the at least one adjacent pixel collection circuit, the second latch may be set, and the pixel unit may be in the passively-activated state. Upon the receipt of the row response signal and the column response signal simultaneously, the second latch may be reset, and the pixel unit may be in the nonactivated state. When the second latch has been reset, the second state storage module 230 may transmit the resetting signal to the light intensity change amplifier 260.

The light intensity signal collection and storage module 240 may store and output the first electric signal as the light intensity signal in accordance with the state of the pixel collection circuit. When the pixel collection circuit is in the nonactivated state, the light intensity signal collection and storage module 240 may sample in real time the first electric signal. After the pixel collection circuit has been in the activated state (i.e., the initiatively-activated state or the passively-activated state), the light intensity signal collection and storage module 240 may store the sampled first electric signal, until it has received the row response signal from the first state storage module 220 or the second state storage module 230. Then, the light intensity signal collection and storage module 240 may output the stored first electric signal as the light intensity signal.

The time information storage module 250 may store and output the corresponding time signal in accordance with the state of the pixel collection circuit. When the pixel collection circuit is in the nonactivated state, the time information storage module 250 may sample in real time the first time signal from the time signal line. After the pixel collection circuit has been in the activated state (i.e., the initiatively-activated state or the passively-activated state), the time information storage module 250 may store the sampled first time signal, until it has received the row response signal from the first state storage module 220 or the second state storage module 230. Then, the time information storage module 250 may output the stored first time signal as the time signal.

According to the embodiments of the present disclosure, each pixel collection circuit in the pixel collection circuit array of the optical flow sensor may detect in real time a light intensity change in a field of vision, and when the light intensity change meets the predetermined condition, the pixel collection circuit may be triggered to be in the initiatively-activated state. The pixel collection circuit in the initiatively-activated state may transmit the pulse signal to four or more pixel collection circuits surrounding the pixel collection circuit, so as to enable the adjacent pixel collection circuits in a deactivated state to be in the passively-activated state. When each pixel collection circuit is activated initiatively, light intensity information and time information about this pixel collection circuit and the passively-activated pixel collection circuits may be sampled, stored and output to an image collection system.

According to the optical flow sensor in the embodiments of the present disclosure, it is able to collect a light intensity of a corresponding pixel point of a target object in the field of vision at a certain moment, light intensities of the pixel points surrounding the pixel point, and light intensities of the same pixel point at different moments, thereby to acquire parameters of an optical flow constraint equation for an optical flow algorithm, i.e., a time-domain gradient value and a space-domain gradient value of the pixel point. As a result, it is able to extract the parameters through hardware, and reduce the quantity of parallel computation for the subsequent data processing, and rapidly identify and process the target object at a high speed, and effectively analyze a movement speed and a movement direction of the target object, thereby to prevent the occurrence of time delay caused when the target object at a high speed is analyzed by a collision avoidance system, an unmanned aerial vehicle (UAV) or an unmanned ground vehicle (UGV) in the field of vision, and improve the system detection efficiency and accuracy.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

The followings are also provided in the embodiments of the present disclosure.

A8. The pixel collection circuit according to A7, wherein the second state storage module includes a second latch configured to be set upon the receipt of the pulse signal from at least one adjacent pixel collection circuit, and reset upon the receipt of the row response signal and the column response signal simultaneously, wherein the second state storage module is further configured to transmit the resetting signal to the light intensity change amplifier when the second latch has been reset.

A9. The pixel collection circuit according to any one of $A_2$ to A8, wherein the preprocessing includes the isolation of the direct current component and the amplification of the alternating current component.

A10. The pixel collection circuit according to any one of A1 to A9, wherein the light intensity detector includes: a photodiode $PD_1$ whose anode is grounded; and a first transistor $T_1$, a source electrode of which is connected to a cathode of the photodiode $PD_1$, and a drain electrode and a gate electrode of which are connected to a power source VDD.

A11. The pixel collection circuit according to any one of A1 to A9, wherein the light intensity detector includes: a photodiode $PD_1$ whose anode is grounded; a first transistor $T_1$, a source electrode of which is connected to a power source VDD; and a second transistor $T_2$, a source electrode of which is connected to a cathode of the photodiode $PD_1$, and a drain electrode of which is connected to a gate electrode and a drain electrode of the first transistor $T_1$.

A12. The pixel collection circuit according to any one of A1 to A9, wherein the light intensity detector includes: a photodiode $PD_1$ whose anode is grounded; N transistors connected in series, $N \geq 2$, a source electrode of a first transistor being connected to a cathode of the photodiode $PD_1$, a source electrode of an $N^{th}$ transistor being connected to a power source VDD, a drain electrode of each of a second to the $N^{th}$ transistors being connected to a source electrode of a previous transistor, a gate electrode of each of the second to the $N^{th}$ transistors being connected to a drain electrode of the previous transistor; and a first amplifier $A_1$ connected between the cathode of the photodiode $PD_1$ and a gate electrode of the first transistor.

A13. The pixel collection circuit according to any one of $A_2$ to A12, wherein the light intensity change amplifier includes a second amplifier $A_2$, a positive pole of which is connected to an output end of the light intensity detector, and a negative pole of which is connected to a first pull-down resistor $R_1$, wherein a second resistor $R_2$ is connected between an output end and the negative pole of the second amplifier, and the second amplifier is configured to preprocess the first electric signal from the light intensity detector.

A14. The pixel collection circuit according to any one of $A_2$ to A12, wherein the light intensity change amplifier includes: a third transistor $T_3$, a drain electrode of which is connected to the output end of the light intensity detector; a fourth transistor $T_4$, a drain electrode of which is connected to the output end of the light intensity detector; a first capacitor $C_1$, a first end of which is connected to a source electrode of the third transistor $T_3$, and a second end of which is grounded; a second capacitor $C_2$, a first end of which is connected to a source electrode of the fourth transistor $T_4$, and a second end of which is grounded; a fifth transistor $T_5$, a drain electrode of which is connected to the first end of the first capacitor $C_1$; a sixth transistor $T_6$, a gate electrode of which is connected to a gate electrode of the fifth transistor $T_5$, and a drain electrode of which is connected to the first end of the second capacitor $C_2$; and a third amplifier $A_3$, a positive pole of which is connected to a source electrode of the fifth transistor $T_5$, and a negative pole of which is connected to a source electrode of the sixth transistor $T_6$.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A pixel collection circuit, comprising:
   a light intensity detector which is configured to output in real time a first electric signal representing an intensity of a received optical signal;
   a first state storage module, a first input end of which is coupled to the light intensity detector, a first output end of which is coupled to a row request line, a second output end of which is coupled to a column request line, and which is configured to enable the pixel collection circuit to be an initiatively-activated state and store the initiatively-activated state when a change of the first electric signal meets a predetermined condition, transmit a row request signal and/or a column request signal to the row request line and/or the column request line in the initiatively-activated state, and transmit a pulse signal to at least one adjacent pixel collection circuit in the initiatively-activated state;
   a second state storage module, a first input end of which is coupled to at least one adjacent pixel collection circuit, an output end of which is coupled to the first state storage module, and which is configured to, upon the receipt of a pulse signal from the at least one adjacent pixel collection circuit, enable the pixel collection circuit to be in a passively-activated state and store the passively-activated state, and transmit a notification to the first state storage module in the passively-activated state, so as to enable the first state storage module to transmit the row request signal and/or the column request signal to the row request line and/or the column request line;
   a light intensity signal collection and storage module, a first input end of which is coupled to an output end of the light intensity detector, a second input end of which is coupled to the first state storage module, a third input end of which is coupled to the second state storage module, and which is configured to store and output the first electric signal as a light intensity signal in accordance with the state of the pixel collection circuit; and
   a time information storage module, a first input end of which is coupled to a time signal line, a second input end of which is coupled to the first state storage module, a third input end of which is coupled to the second state storage module, and which is configured to store and output a corresponding time signal in accordance with the state of the pixel collection circuit.

2. The pixel collection circuit according to claim 1, further comprising:
   a light intensity change amplifier, an input end of which is coupled to the output end of the light intensity detector and which is configured to preprocess the first electric signal so as to generate a second electric signal; and
   a dual-threshold filter, an output end of which is coupled to an output end of the light intensity change amplifier, and which is configured to determine whether a change of the second electric signal meets the predetermined condition,
wherein the first state storage module is coupled to the dual-threshold filter and further configured to enable the pixel collection circuit to be in the initiatively-activated state when the change of the second electric signal meets the predetermined condition.

3. The pixel collection circuit according to claim 2, wherein the light intensity signal collection and storage module is further configured to:
sample in real time the first electric signal when the pixel collection circuit is in a nonactivated state; and
after the pixel collection circuit is in an activated state, store the sampled first electric signal until a row response signal has been received from the first state storage module or the second state storage module, and output the stored first electric signal as the light intensity signal.

4. The pixel collection circuit according to claim 3, wherein the time information storage module is further configured to:
sample a first time signal from the time signal line when the pixel collection circuit is in the nonactivated state; and
after the pixel collection circuit is in the activated state, store the sampled first time signal until the row response signal has been received from the first state storage module or the second state storage module, and output the stored first time signal as the time signal.

5. The pixel collection circuit according to claim 4, wherein a second input end of the first state storage module is coupled to a row response line and a third input end of the first state storage module is coupled to a column response line, and the first state storage module is further configured to enable the pixel collection circuit to be deactivated upon the receipt of the row response signal from the row response line and a row response signal form the column response line simultaneously; and
a third output end of the first state storage module is coupled to the light intensity change amplifier, and the first state storage module is further configured to transmit a resetting signal to the light intensity change amplifier when the pixel collection circuit is in the activated state or in a deactivated state.

6. The pixel collection circuit according to claim 5, wherein the first state storage module includes a first latch configured to be set when the second electric signal meets the predetermined condition, and reset when the row response signal and the column response signal have been received simultaneously,
wherein the first state storage module is further configured to transmit the resetting signal to the light intensity change amplifier when the first latch has been set or reset.

7. The pixel collection circuit according to claim 6, wherein a second input end of the second state storage module is coupled to the row response line and a third input end of the second state storage module is coupled to the column response line, and the second state storage module is further configured to enable the pixel collection circuit to be deactivated upon the receipt of the row response signal from the row response line and the column response signal from the column response line simultaneously,
wherein the second state storage module is further configured to transmit a resetting signal to the light intensity change amplifier through the first state storage module when the pixel collection circuit is in the deactivated state.

8. An optical flow sensor, comprising:
a pixel collection circuit array comprising a plurality of pixel collection circuits according to claim 7;
a pixel row signal communication unit configured to respond to each row request signal from the pixel collection circuit array, and output a row address of a row which has responded to the row request signal;
a pixel column signal communication unit configured to respond to each column request signal from the pixel collection circuit array, and output a column address of a column which has responded to the column request signal, a corresponding light intensity signal, and a corresponding time signal;
a time control unit configured to output a first time signal via a time signal line to the pixel collection circuit array; and
a central adjustment and control unit configured to control the output of the row address, the column address, the time signal and the light intensity signal.

9. The optical flow sensor according to claim 8, wherein the pixel row signal communication unit comprises:
a row signal response communication module configured to receive the row request signal from at least one pixel collection circuit in the pixel collection circuit array, and output a row response signal with respect to one of the row request signals; and
a row address collection unit configured to output encoding information about the row address of a row which has responded to the row request signal.

10. The optical flow sensor according to claim 9, wherein the pixel column signal communication unit comprises:
a column signal response communication module configured to receive the column request signal from at least one pixel collection circuit in the pixel collection circuit array, and output a column response signal with respect to one of the column request signals;
a column address collection module configured to output encoding information about the column address of a column which has responded to the row request signal; and
a column output selection control module configured to control an output sequence of the light intensity signal, the time signal and the column address.

* * * * *